(12) United States Patent
Marecki et al.

(10) Patent No.: US 12,544,070 B2
(45) Date of Patent: Feb. 10, 2026

(54) SURGICAL HANDLE ASSEMBLY

(71) Applicant: Lexington Medical, Inc., Bedford, MA (US)

(72) Inventors: Andrew Marecki, Wilbraham, MA (US); Richard Moyer, Allston, MA (US)

(73) Assignee: Lexington Medical, Inc., Bedford, MA (US)

( * ) Notice: Subject to any disclaimer, the term of this patent is extended or adjusted under 35 U.S.C. 154(b) by 0 days.

(21) Appl. No.: 18/800,702

(22) Filed: Aug. 12, 2024

(65) Prior Publication Data

US 2025/0114094 A1    Apr. 10, 2025

Related U.S. Application Data

(63) Continuation of application No. 18/129,324, filed on Mar. 31, 2023, now Pat. No. 12,089,846, which is a continuation of application No. 17/241,538, filed on Apr. 27, 2021, now Pat. No. 11,622,764.

(51) Int. Cl.
| | |
|---|---|
| *A61B 17/072* | (2006.01) |
| *A61B 17/00* | (2006.01) |
| *A61B 17/29* | (2006.01) |

(52) U.S. Cl.
CPC ............ *A61B 17/07207* (2013.01); *A61B 2017/00398* (2013.01); *A61B 2017/07271* (2013.01); *A61B 2017/07285* (2013.01); *A61B 2017/2925* (2013.01); *A61B 2017/2943* (2013.01)

(58) Field of Classification Search
CPC .... A61B 17/07207; A61B 2017/00398; A61B 2017/07271; A61B 2017/07285; A61B 2017/2925; A61B 2017/2943

USPC .................................................... 227/180.1
See application file for complete search history.

(56) References Cited

U.S. PATENT DOCUMENTS

| | | | |
|---|---|---|---|
| RE28,932 E | 8/1976 | Noiles et al. | |
| 4,403,722 A | 9/1983 | Nikolich | |
| 4,572,419 A * | 2/1986 | Klaus .................. | B25C 5/15 |
| | | | 227/155 |
| 4,725,764 A | 2/1988 | Prestel | |
| 4,728,876 A | 3/1988 | Mongeon et al. | |
| 4,737,608 A | 4/1988 | Jones | |

(Continued)

FOREIGN PATENT DOCUMENTS

| | | |
|---|---|---|
| CN | 101507643 A | 8/2009 |
| CN | 101664331 A | 3/2010 |

(Continued)

OTHER PUBLICATIONS

Final Office Action received in U.S. Appl. No. 18/496,107 dated Apr. 7, 2025, 35 pages.

(Continued)

*Primary Examiner* — Dariush Seif
(74) *Attorney, Agent, or Firm* — Dorsey & Whitney LLP

(57) ABSTRACT

The present disclosure includes apparatuses for a surgical handle assembly. An example apparatus includes a reloadable cartridge assembly and a surgical handle assembly including a spring positioned in the surgical handle assembly at a proximal end of a toothed rack. Proximal movement of the toothed rack causes the spring to be compressed and allows for complete opening of the reloadable cartridge assembly.

20 Claims, 5 Drawing Sheets

DETAIL C

(56) References Cited

U.S. PATENT DOCUMENTS

| | | | |
|---|---|---|---|
| 4,938,408 A | 7/1990 | Bedi et al. | |
| 4,964,558 A | 10/1990 | Crutcher et al. | |
| 4,978,049 A | 12/1990 | Green | |
| 5,199,419 A * | 4/1993 | Remiszewski | A61B 1/32 |
| | | | 606/198 |
| 5,300,081 A | 4/1994 | Young et al. | |
| 5,326,013 A | 7/1994 | Green et al. | |
| RE34,680 E | 8/1994 | Lieser | |
| 5,467,911 A | 11/1995 | Tsuruta et al. | |
| 5,474,223 A | 12/1995 | Viola et al. | |
| 5,484,095 A | 1/1996 | Green et al. | |
| 5,489,058 A | 2/1996 | Plyley et al. | |
| 5,489,292 A | 2/1996 | Tovey et al. | |
| 5,507,426 A | 4/1996 | Young et al. | |
| 5,522,534 A | 6/1996 | Viola et al. | |
| 5,535,935 A | 7/1996 | Vidal et al. | |
| 5,553,675 A | 9/1996 | Pitzen et al. | |
| 5,586,711 A | 12/1996 | Plyley et al. | |
| 5,588,579 A | 12/1996 | Schnut et al. | |
| 5,601,224 A | 2/1997 | Bishop et al. | |
| 5,736,703 A | 4/1998 | Kim | |
| 5,758,814 A | 6/1998 | Gallagher et al. | |
| 5,762,256 A | 6/1998 | Mastri et al. | |
| 5,799,857 A | 9/1998 | Robertson et al. | |
| 5,823,066 A | 10/1998 | Huitema et al. | |
| 5,836,503 A | 11/1998 | Ehrenfels et al. | |
| 5,865,361 A | 2/1999 | Milliman et al. | |
| 5,901,895 A | 5/1999 | Heaton et al. | |
| 6,109,500 A | 8/2000 | Alli et al. | |
| 6,281,453 B1 | 8/2001 | Uleski | |
| 6,302,798 B1 | 10/2001 | Nakaguro et al. | |
| 6,905,057 B2 * | 6/2005 | Swayze | A61B 17/07207 |
| | | | 227/176.1 |
| 6,945,444 B2 | 9/2005 | Gresham et al. | |
| 6,957,758 B2 | 10/2005 | Aranyi | |
| 7,021,399 B2 | 4/2006 | Driessen | |
| 7,044,352 B2 | 5/2006 | Shelton et al. | |
| 7,044,353 B2 | 5/2006 | Mastri et al. | |
| 7,083,075 B2 | 8/2006 | Swayze et al. | |
| 7,097,089 B2 | 8/2006 | Marczyk | |
| 7,128,254 B2 | 10/2006 | Shelton et al. | |
| 7,143,923 B2 | 12/2006 | Shelton et al. | |
| 7,143,924 B2 | 12/2006 | Scirica et al. | |
| 7,168,604 B2 | 1/2007 | Milliman et al. | |
| 7,225,963 B2 | 6/2007 | Scirica | |
| 7,225,964 B2 | 6/2007 | Mastri et al. | |
| 7,234,624 B2 | 6/2007 | Gresham et al. | |
| 7,246,734 B2 | 7/2007 | Shelton | |
| 7,303,106 B2 | 12/2007 | Milliman et al. | |
| 7,325,713 B2 | 2/2008 | Aranyi | |
| 7,364,060 B2 | 4/2008 | Milliman | |
| 7,380,695 B2 | 6/2008 | Doll et al. | |
| 7,380,696 B2 | 6/2008 | Shelton et al. | |
| 7,398,907 B2 | 7/2008 | Racenet et al. | |
| 7,404,508 B2 | 7/2008 | Smith et al. | |
| 7,416,101 B2 | 8/2008 | Shelton et al. | |
| RE40,514 E | 9/2008 | Mastri et al. | |
| 7,422,136 B1 * | 9/2008 | Marczyk | A61B 17/07207 |
| | | | 227/176.1 |
| 7,445,139 B2 | 11/2008 | Okouchi | |
| 7,455,208 B2 | 11/2008 | Wales et al. | |
| 7,490,749 B2 | 2/2009 | Schall et al. | |
| 7,494,038 B2 | 2/2009 | Milliman | |
| 7,516,877 B2 | 4/2009 | Aranyi | |
| 7,546,940 B2 | 6/2009 | Milliman et al. | |
| 7,611,038 B2 | 11/2009 | Racenet et al. | |
| 7,624,902 B2 | 12/2009 | Marczyk et al. | |
| 7,658,311 B2 | 2/2010 | Boudreaux | |
| 7,694,865 B2 | 4/2010 | Scirica | |
| 7,753,245 B2 | 7/2010 | Boudreaux et al. | |
| 7,780,055 B2 | 8/2010 | Scirica et al. | |
| 7,784,663 B2 | 8/2010 | Shelton | |
| 7,794,475 B2 | 9/2010 | Hess et al. | |
| 7,802,712 B2 | 9/2010 | Milliman et al. | |
| 7,819,296 B2 * | 10/2010 | Hueil | A61B 17/07207 |
| | | | 227/19 |
| 7,824,426 B2 | 11/2010 | Racenet et al. | |
| 7,832,408 B2 | 11/2010 | Shelton et al. | |
| 7,837,079 B2 | 11/2010 | Holsten et al. | |
| 7,845,535 B2 | 12/2010 | Scircia | |
| 7,857,187 B2 | 12/2010 | Milliman | |
| 7,922,063 B2 | 4/2011 | Racenet et al. | |
| 7,926,692 B2 | 4/2011 | Racenet et al. | |
| 7,963,431 B2 | 6/2011 | Scirica | |
| 7,967,178 B2 * | 6/2011 | Scirica | A61B 17/07207 |
| | | | 227/19 |
| 7,967,180 B2 | 6/2011 | Scirica | |
| 8,020,743 B2 | 9/2011 | Shelton | |
| 8,056,789 B1 | 11/2011 | White et al. | |
| 8,061,576 B2 | 11/2011 | Cappola | |
| 8,070,036 B1 | 12/2011 | Knodel | |
| 8,070,836 B2 | 12/2011 | Ng et al. | |
| 8,123,101 B2 | 2/2012 | Racenet et al. | |
| 8,136,712 B2 | 3/2012 | Zingman | |
| 8,141,763 B2 | 3/2012 | Milliman | |
| 8,157,148 B2 | 4/2012 | Scirica | |
| 8,186,555 B2 | 5/2012 | Shelton et al. | |
| 8,210,411 B2 | 7/2012 | Yates et al. | |
| 8,235,274 B2 | 8/2012 | Cappola | |
| 8,292,157 B2 | 10/2012 | Smith et al. | |
| 8,308,040 B2 | 11/2012 | Huang et al. | |
| 8,328,822 B2 | 12/2012 | Huitema et al. | |
| 8,336,751 B2 | 12/2012 | Scirica | |
| 8,336,754 B2 | 12/2012 | Cappola et al. | |
| 8,342,378 B2 | 1/2013 | Marczyk et al. | |
| 8,360,296 B2 | 1/2013 | Zingman | |
| 8,413,468 B2 | 4/2013 | Pigorini | |
| 8,413,868 B2 | 4/2013 | Cappola | |
| 8,414,577 B2 | 4/2013 | Boudreaux et al. | |
| 8,424,736 B2 | 4/2013 | Scirica et al. | |
| 8,499,992 B2 | 8/2013 | Whitman et al. | |
| 8,506,557 B2 | 8/2013 | Zemlok et al. | |
| 8,517,241 B2 | 8/2013 | Nicholas et al. | |
| 8,573,460 B2 | 11/2013 | Cappola | |
| 8,573,463 B2 | 11/2013 | Scirica et al. | |
| 8,574,463 B2 | 11/2013 | Tani et al. | |
| 8,584,919 B2 | 11/2013 | Hueil et al. | |
| 8,608,043 B2 | 12/2013 | Scirica | |
| 8,608,045 B2 | 12/2013 | Smith et al. | |
| 8,622,894 B2 | 1/2014 | Banik et al. | |
| 8,672,205 B2 | 3/2014 | Leitner | |
| 8,684,247 B2 | 4/2014 | Scirica et al. | |
| 8,684,249 B2 | 4/2014 | Racenet et al. | |
| 8,685,004 B2 | 4/2014 | Zemlock et al. | |
| 8,695,865 B2 | 4/2014 | Smith et al. | |
| 8,708,211 B2 | 4/2014 | Zemlok et al. | |
| 8,708,213 B2 | 4/2014 | Shelton et al. | |
| 8,806,973 B2 | 8/2014 | Ross et al. | |
| 8,820,607 B2 | 9/2014 | Marczyk | |
| 8,888,762 B2 | 11/2014 | Whitman | |
| 8,888,814 B2 | 11/2014 | Cappola | |
| 8,894,647 B2 | 11/2014 | Beardsley et al. | |
| 8,910,847 B2 | 12/2014 | Nalagatla et al. | |
| 8,925,783 B2 | 1/2015 | Zemlok et al. | |
| 9,113,876 B2 | 8/2015 | Racenet et al. | |
| 9,155,529 B2 | 10/2015 | Beardsley et al. | |
| 9,204,876 B2 | 12/2015 | Cappola et al. | |
| 9,232,944 B2 | 1/2016 | Cappola et al. | |
| 9,265,585 B2 | 2/2016 | Wingardner et al. | |
| 9,320,519 B1 | 4/2016 | Knodel | |
| 9,364,218 B2 | 6/2016 | Scirica | |
| 9,364,226 B2 | 6/2016 | Zemlok et al. | |
| 9,393,016 B2 | 7/2016 | Scirica et al. | |
| 9,445,810 B2 | 9/2016 | Cappola | |
| 9,465,873 B1 | 10/2016 | Franke et al. | |
| 9,474,528 B2 | 10/2016 | Marczyk | |
| 9,498,216 B2 | 11/2016 | Williams | |
| 9,504,520 B2 * | 11/2016 | Worrell | A61B 18/1447 |
| 9,522,029 B2 * | 12/2016 | Yates | A61B 17/068 |
| 9,539,006 B2 | 1/2017 | Collings et al. | |
| 9,554,803 B2 | 1/2017 | Smith et al. | |
| 9,629,623 B2 | 4/2017 | Lytle et al. | |
| 9,636,091 B2 | 5/2017 | Beardsley et al. | |

(56) References Cited

U.S. PATENT DOCUMENTS

| | | | |
|---|---|---|---|
| 9,655,617 B2 | 5/2017 | Cappola | |
| 9,668,731 B2 | 6/2017 | Zemlok et al. | |
| 9,668,735 B2 | 6/2017 | Beetel | |
| 9,801,679 B2* | 10/2017 | Trees | A61B 18/1445 |
| 9,820,738 B2 | 11/2017 | Lytle et al. | |
| 9,839,425 B2 | 12/2017 | Zergiebel et al. | |
| 9,861,358 B2 | 1/2018 | Marczyk et al. | |
| 9,867,675 B2 | 1/2018 | Beardsley et al. | |
| 9,872,673 B2 | 1/2018 | Beardsley et al. | |
| 9,918,713 B2 | 3/2018 | Zergiebel et al. | |
| 9,931,739 B2 | 4/2018 | Nelson et al. | |
| 9,968,276 B2 | 5/2018 | Koktzoglou | |
| 9,987,029 B2 | 6/2018 | Beardsley et al. | |
| 9,993,258 B2 | 6/2018 | Shelton et al. | |
| 10,004,504 B2 | 6/2018 | Bryant | |
| 10,098,637 B2 | 10/2018 | Zergiebel et al. | |
| 10,105,139 B2 | 10/2018 | Yates et al. | |
| 10,383,634 B2 | 8/2019 | Shelton et al. | |
| 10,433,842 B2 | 10/2019 | Amariglio et al. | |
| 10,646,271 B2* | 5/2020 | Trees | A61B 18/1445 |
| 10,856,871 B2 | 12/2020 | Somekh et al. | |
| 11,103,247 B2 | 8/2021 | Amariglio et al. | |
| 11,166,723 B2 | 11/2021 | Somekh et al. | |
| 11,617,583 B2 | 4/2023 | Somekh et al. | |
| 11,622,764 B2 | 4/2023 | Marecki et al. | |
| 12,089,846 B2 | 9/2024 | Marecki et al. | |
| 12,268,391 B2 | 4/2025 | Somekh et al. | |
| 12,343,009 B2 | 7/2025 | Marecki et al. | |
| 12,414,766 B2 | 9/2025 | Amariglio et al. | |
| 2001/0030219 A1 | 10/2001 | Green et al. | |
| 2002/0134811 A1 | 9/2002 | Napier et al. | |
| 2004/0024361 A1 | 2/2004 | Fago et al. | |
| 2004/0232199 A1 | 11/2004 | Shelton et al. | |
| 2005/0006429 A1 | 1/2005 | Wales et al. | |
| 2005/0116009 A1 | 6/2005 | Milliman | |
| 2006/0079912 A1 | 4/2006 | Whitfield et al. | |
| 2006/0111210 A1 | 5/2006 | Hinman | |
| 2007/0102470 A1 | 5/2007 | Miyashita et al. | |
| 2007/0125826 A1 | 6/2007 | Shelton | |
| 2007/0257080 A1 | 11/2007 | Kamins et al. | |
| 2007/0262116 A1 | 11/2007 | Hueil et al. | |
| 2008/0017693 A1 | 1/2008 | Mastri et al. | |
| 2008/0083810 A1 | 4/2008 | Marczyk | |
| 2008/0114315 A1* | 5/2008 | Voegele | A61B 17/00491 604/311 |
| 2008/0179374 A1 | 7/2008 | Beardsley et al. | |
| 2008/0296346 A1 | 12/2008 | Shelton et al. | |
| 2008/0314958 A1 | 12/2008 | Scirica | |
| 2009/0062614 A1 | 3/2009 | Adzich et al. | |
| 2009/0145947 A1 | 6/2009 | Scirica et al. | |
| 2009/0206131 A1* | 8/2009 | Weisenburgh, II | A61B 17/068 227/180.1 |
| 2009/0272614 A1 | 11/2009 | Watarai | |
| 2010/0001036 A1 | 1/2010 | Marczyk et al. | |
| 2010/0012700 A1 | 1/2010 | Perron et al. | |
| 2010/0094091 A1* | 4/2010 | Cappola | A61B 17/072 600/137 |
| 2010/0258611 A1 | 10/2010 | Smith et al. | |
| 2010/0264193 A1 | 10/2010 | Huang et al. | |
| 2011/0009850 A1 | 1/2011 | Main et al. | |
| 2011/0011915 A1 | 1/2011 | Shelton, IV | |
| 2011/0024479 A1 | 2/2011 | Swensgard et al. | |
| 2011/0036890 A1 | 2/2011 | Ma | |
| 2011/0062211 A1 | 3/2011 | Ross et al. | |
| 2011/0166585 A1 | 7/2011 | Roth et al. | |
| 2011/0248062 A1 | 10/2011 | Fujimoto | |
| 2011/0253765 A1 | 10/2011 | Nicholas et al. | |
| 2011/0290854 A1 | 12/2011 | Timm et al. | |
| 2011/0295313 A1 | 12/2011 | Kerr | |
| 2012/0074194 A1 | 3/2012 | Miller et al. | |
| 2012/0074201 A1 | 3/2012 | Baxter et al. | |
| 2012/0080477 A1 | 4/2012 | Leimbach et al. | |
| 2012/0116391 A1* | 5/2012 | Houser | A61B 34/76 606/1 |
| 2012/0184990 A1 | 7/2012 | Twomey | |
| 2012/0239012 A1 | 9/2012 | Laurent et al. | |
| 2012/0286019 A1 | 11/2012 | Hueil et al. | |
| 2012/0286020 A1 | 11/2012 | Smith et al. | |
| 2012/0293103 A1 | 11/2012 | Forster et al. | |
| 2013/0030428 A1 | 1/2013 | Worrell et al. | |
| 2013/0053831 A1* | 2/2013 | Johnson | A61B 17/2909 606/1 |
| 2013/0056235 A1 | 3/2013 | Pozgay et al. | |
| 2013/0092719 A1* | 4/2013 | Kostrzewski | A61B 17/105 227/177.1 |
| 2013/0098966 A1 | 4/2013 | Kostrzewski et al. | |
| 2013/0140050 A1 | 6/2013 | Eshleman et al. | |
| 2013/0168435 A1 | 7/2013 | Huang et al. | |
| 2013/0199327 A1 | 8/2013 | Park et al. | |
| 2013/0245676 A1 | 9/2013 | Cappola | |
| 2013/0304115 A1 | 11/2013 | Miyamoto | |
| 2014/0001231 A1 | 1/2014 | Shelton et al. | |
| 2014/0025103 A1* | 1/2014 | Hundertmark | A61B 17/0057 606/213 |
| 2014/0110452 A1 | 4/2014 | Moore et al. | |
| 2014/0148803 A1 | 5/2014 | Taylor | |
| 2014/0224856 A1 | 8/2014 | Smith et al. | |
| 2014/0263543 A1 | 9/2014 | Leimbach et al. | |
| 2014/0276949 A1 | 9/2014 | Staunton et al. | |
| 2014/0277017 A1 | 9/2014 | Leimbach et al. | |
| 2014/0305988 A1* | 10/2014 | Boudreaux | A61B 17/072 227/175.3 |
| 2014/0305994 A1 | 10/2014 | Parihar et al. | |
| 2015/0053749 A1 | 2/2015 | Shelton et al. | |
| 2015/0196966 A1 | 7/2015 | Tsai | |
| 2015/0196996 A1 | 7/2015 | Nelson et al. | |
| 2015/0209059 A1* | 7/2015 | Trees | A61B 18/1445 606/205 |
| 2015/0282825 A1 | 10/2015 | Trees et al. | |
| 2015/0297216 A1* | 10/2015 | Williams | A61B 17/07207 227/175.2 |
| 2015/0342605 A1 | 12/2015 | Abbott et al. | |
| 2015/0374396 A1 | 12/2015 | Strobl et al. | |
| 2016/0058441 A1 | 3/2016 | Morgan et al. | |
| 2016/0074106 A1* | 3/2016 | Garrison | A61B 18/1447 606/41 |
| 2016/0089175 A1* | 3/2016 | Hibner | A61B 17/282 606/205 |
| 2016/0166248 A1 | 6/2016 | Deville et al. | |
| 2016/0166250 A1 | 6/2016 | Marczyk | |
| 2016/0249945 A1 | 9/2016 | Shelton et al. | |
| 2016/0270786 A1 | 9/2016 | Scirica | |
| 2016/0310137 A1* | 10/2016 | Scirica | A61B 17/0682 |
| 2017/0000485 A1 | 1/2017 | Shelton et al. | |
| 2017/0172577 A1 | 6/2017 | Wenchell et al. | |
| 2017/0224334 A1 | 8/2017 | Worthington et al. | |
| 2017/0224343 A1 | 8/2017 | Baxter et al. | |
| 2017/0245856 A1 | 8/2017 | Baxter et al. | |
| 2017/0252096 A1* | 9/2017 | Felder | A61B 18/1445 |
| 2017/0281177 A1 | 10/2017 | Harris et al. | |
| 2017/0281184 A1 | 10/2017 | Shelton et al. | |
| 2017/0281220 A1 | 10/2017 | Hibner et al. | |
| 2018/0021041 A1* | 1/2018 | Zhang | A61B 17/1155 227/175.2 |
| 2018/0021082 A1* | 1/2018 | Trees | A61B 18/1445 606/205 |
| 2018/0042637 A1 | 2/2018 | Craig et al. | |
| 2018/0078354 A1 | 3/2018 | Cardinale et al. | |
| 2018/0091145 A1 | 3/2018 | Dey et al. | |
| 2018/0153545 A1* | 6/2018 | Zergiebel | A61B 17/07207 |
| 2018/0161951 A1 | 6/2018 | Billings et al. | |
| 2018/0168575 A1* | 6/2018 | Simms | A61B 34/30 |
| 2018/0168599 A1 | 6/2018 | Bakos et al. | |
| 2018/0168649 A1 | 6/2018 | Shelton et al. | |
| 2018/0289370 A1 | 10/2018 | Amariglio et al. | |
| 2018/0310935 A1 | 11/2018 | Wixey | |
| 2018/0317915 A1 | 11/2018 | McDonald | |
| 2018/0368832 A1 | 12/2018 | Marecki et al. | |
| 2019/0000439 A1* | 1/2019 | Gustafson | A61B 17/06061 |
| 2019/0000536 A1 | 1/2019 | Yates et al. | |
| 2019/0008509 A1 | 1/2019 | Shelton et al. | |
| 2019/0125324 A1 | 5/2019 | Scheib et al. | |
| 2019/0133593 A1* | 5/2019 | P V R | A61B 17/1285 |

(56) References Cited

U.S. PATENT DOCUMENTS

| | | | |
|---|---|---|---|
| 2019/0183491 A1 | 6/2019 | Shelton et al. | |
| 2019/0261984 A1* | 8/2019 | Nelson | A61B 17/07207 |
| 2019/0290265 A1* | 9/2019 | Shelton, IV | A61B 17/105 |
| 2020/0008801 A1 | 1/2020 | Somekh et al. | |
| 2020/0015818 A1 | 1/2020 | Amariglio et al. | |
| 2020/0046362 A1 | 2/2020 | Baril et al. | |
| 2020/0061847 A1 | 2/2020 | Dixon | |
| 2020/0093486 A1 | 3/2020 | Somekh et al. | |
| 2020/0222046 A1* | 7/2020 | Somekh | A61B 17/07207 |
| 2020/0281594 A1 | 9/2020 | Adams et al. | |
| 2020/0297341 A1 | 9/2020 | Yates et al. | |
| 2020/0405293 A1 | 12/2020 | Shelton et al. | |
| 2021/0007740 A1 | 1/2021 | Marecki et al. | |
| 2021/0059673 A1 | 3/2021 | Shelton et al. | |
| 2021/0085323 A1 | 3/2021 | Somekh et al. | |
| 2021/0093398 A1 | 4/2021 | Ago et al. | |
| 2021/0346021 A1 | 11/2021 | Amariglio et al. | |
| 2022/0133318 A1 | 5/2022 | Hudson et al. | |
| 2022/0183688 A1 | 6/2022 | Moy et al. | |
| 2022/0218335 A1 | 7/2022 | Baxter et al. | |
| 2022/0296232 A1* | 9/2022 | Adams | A61B 17/07207 |
| 2022/0338874 A1 | 10/2022 | Marecki et al. | |
| 2022/0387025 A1 | 12/2022 | Marecki et al. | |
| 2023/0092719 A1 | 3/2023 | Marbach et al. | |
| 2023/0165584 A1 | 6/2023 | Leimbach et al. | |
| 2023/0233207 A1 | 7/2023 | Somekh et al. | |
| 2023/0233208 A1* | 7/2023 | Marecki | A61B 17/2909 227/180.1 |
| 2023/0371947 A1 | 11/2023 | Shelton et al. | |
| 2023/0371954 A1 | 11/2023 | Bear et al. | |
| 2024/0050093 A1 | 2/2024 | Marecki et al. | |
| 2025/0009352 A1* | 1/2025 | Marecki | A61B 17/07207 |

FOREIGN PATENT DOCUMENTS

| | | | |
|---|---|---|---|
| CN | 1985768 | B | 9/2011 |
| CN | 101194853 | B | 7/2012 |
| CN | 101965156 | B | 12/2012 |
| CN | 108542464 | A | 9/2018 |
| CN | 115252012 | A | 11/2022 |
| DE | 112019002420 | T5 | 3/2021 |
| EP | 1563791 | A1 | 8/2005 |
| EP | 1563792 | A1 | 8/2005 |
| EP | 1563794 | A1 | 8/2005 |
| EP | 1709911 | A1 | 10/2006 |
| EP | 1021130 | B1 | 11/2006 |
| EP | 1908410 | A1 | 4/2008 |
| EP | 2253277 | A1 | 11/2010 |
| EP | 2253278 | A1 | 11/2010 |
| EP | 2586382 | A3 | 9/2013 |
| EP | 2777530 | A1 | 9/2014 |
| EP | 2839786 | A1 | 2/2015 |
| EP | 2886020 | A1 | 6/2015 |
| EP | 2886071 | A1 | 6/2015 |
| EP | 2484290 | B1 | 7/2015 |
| EP | 2942022 | A1 | 11/2015 |
| EP | 2311385 | B1 | 5/2017 |
| WO | 2004075728 | A2 | 9/2004 |
| WO | 2016107586 | A1 | 7/2016 |
| WO | 2018035796 | A1 | 3/2018 |
| WO | 2020150360 | A1 | 7/2020 |

OTHER PUBLICATIONS

Notice of Allowance received in U.S. Appl. No. 17/382,705 dated Mar. 5, 2025, 37 pages.
Notice of Allowance received in U.S. Appl. No. 18/129,317 dated Feb. 18, 2025, 13 pages.
Final Office Action received in U.S. Appl. No. 15/481,949 dated May 29, 2019, 15 pages.
International Search Report and Written Opinion dated Apr. 7, 2020 for PCT Application No. PCT/US2020/013694 filed Jan. 15, 2020, 8 pages.
International Search Report and Written Opinion dated Jun. 18, 2018 for PCT Application No. PCT/US2018/025988 filed Apr. 4, 2018, 8 pages.
International Search Report and Written Opinion dated May 25, 2023 for PCT Application No. PCT/US2023/014366 Filed Mar. 2, 2013, 8 pages.
International Search Report and Written Opinion dated Oct. 22, 2018 for PCT Application No. PCT/US2018/038909 filed Jun. 22, 2018, 10 pages.
International Search Report and Written Opinion dated Oct. 4, 2019 for PCT Application No. PCT/US2019/040315 filed Jul. 2, 2018, 9 pages.
International Search Report and Written Opinion received in PCT App No. PCT/US24/52666 dated Dec. 20, 2024.
International Search Report and Written Opinion received in PCT/US2022/032434 dated Oct. 19, 2022, 11 pages.
Non Final Office Action received in U.S. Appl. No. 15/481,949 dated Mar. 18, 2019, 22 pages.
Non Final Office Action received in U.S. Appl. No. 16/249,520 dated Jul. 27, 2020, 10 pages.
Non Final Office Action received in U.S. Appl. No. 17/113,865 dated Sep. 19, 2022, 13 pages.
Non Final Office Action received in U.S. Appl. No. 17/241,538 dated Aug. 16, 2022, 10 pages.
Non Final Office Action received in U.S. Appl. No. 17/382,705 dated Sep. 24, 2024, 10 pages.
Non Final Office Action received in U.S. Appl. No. 17/686,730 dated Jan. 8, 2024, 10 pages.
Non Final Office Action received in U.S. Appl. No. 18/129,317 dated Dec. 8, 2023, 8 pages.
Non Final Office Action received in U.S. Appl. No. 18/129,324 dated Jan. 19, 2024, 9 pages.
Notice of Allowance received in U.S. Appl. No. 16/249,520 dated Nov. 3, 2020, 8 pages.
Notice of Allowance received in U.S. Appl. No. 16/577,097 dated Sep. 13, 2021, 8 pages.
Notice of Allowance received in U.S. Appl. No. 16/582,829 dated May 14, 2021, 7 pages.
Notice of Allowance received in U.S. Appl. No. 17/133,865 dated Dec. 7, 2022; 9 pages.
Notice of Allowance received in U.S. Appl. No. 17/241,538 dated Jan. 11, 2023, 9 pages.
Notice of Allowance received in U.S. Appl. No. 17/686,730 dated Apr. 16, 2024, 7 pages.
Notice of Allowance received in U.S. Appl. No. 17/686,730 dated Aug. 5, 2024, 8 pages.
Notice of Allowance received in U.S. Appl. No. 18/125,314 dated Nov. 8, 2024, 19 pages.
Notice of Allowance received in U.S. Appl. No. 18/129,317 dated Jul. 17, 2024, 7 pages.
Notice of Allowance received in U.S. Appl. No. 18/129,317 dated Mar. 21, 2024, 7 pages.
Notice of Allowance received in U.S. Appl. No. 18/129,324 dated May 15, 2024, 7 pages.
Notice of Allowance received in U.S. Appl. No. 15/481,949 dated Aug. 14, 2019, 10 pages.
Restriction Requirement received in U.S. Appl. No. 17/382,705 dated May 8, 2024, 6 pages.
Restriction Requirement received in U.S. Appl. No. 18/496,107 dated Sep. 24, 2024, 14 pages.
Non-Final Office Action received in U.S. Appl. No. 18/496,107 dated Dec. 12, 2024, 55 pages.
Non-Final Office Action received in U.S. Appl. No. 17/833,302 dated Jan. 30, 2025, 51 pages.
CN First Office Action dated Feb. 28, 2020 for CN Application No. 201880022626.9, 14 pages.
Extended European Search Report received in EP 2282064.1 dated Mar. 5, 2025, pp all.
Extended European Search Report received in EP App No. 20741099.4 dated Sep. 15, 2022, pp all.
Extended European Search Report received in EP Application No. 23763929.9 dated Oct. 2, 2025, pp all.

(56) References Cited

OTHER PUBLICATIONS

Non-Final Office Action received in U.S. Appl. No. 18/496,107 dated Sep. 4, 2025, pp all.
Notice of Allowance dated Apr. 9, 2025 for U.S. Appl. No. 17/833,302, 13 pages.
Notice of Allowance received in U.S. Appl. No. 17/382,705 dated May 20, 2025, pp all.

* cited by examiner

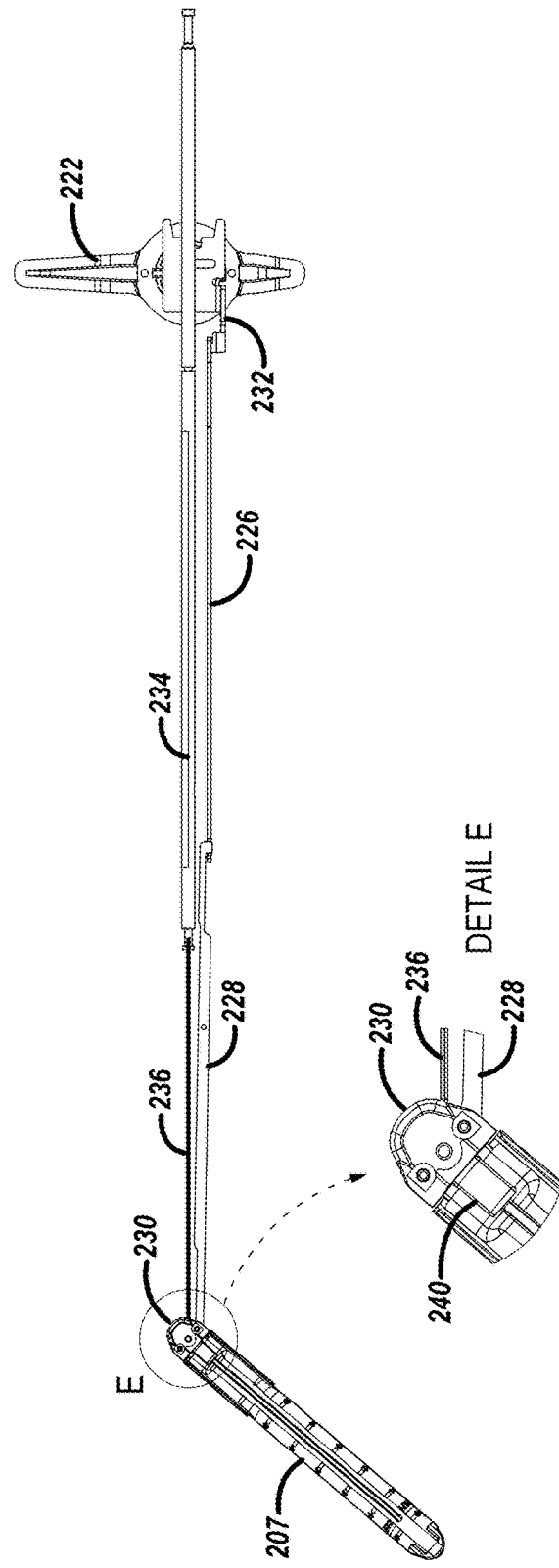
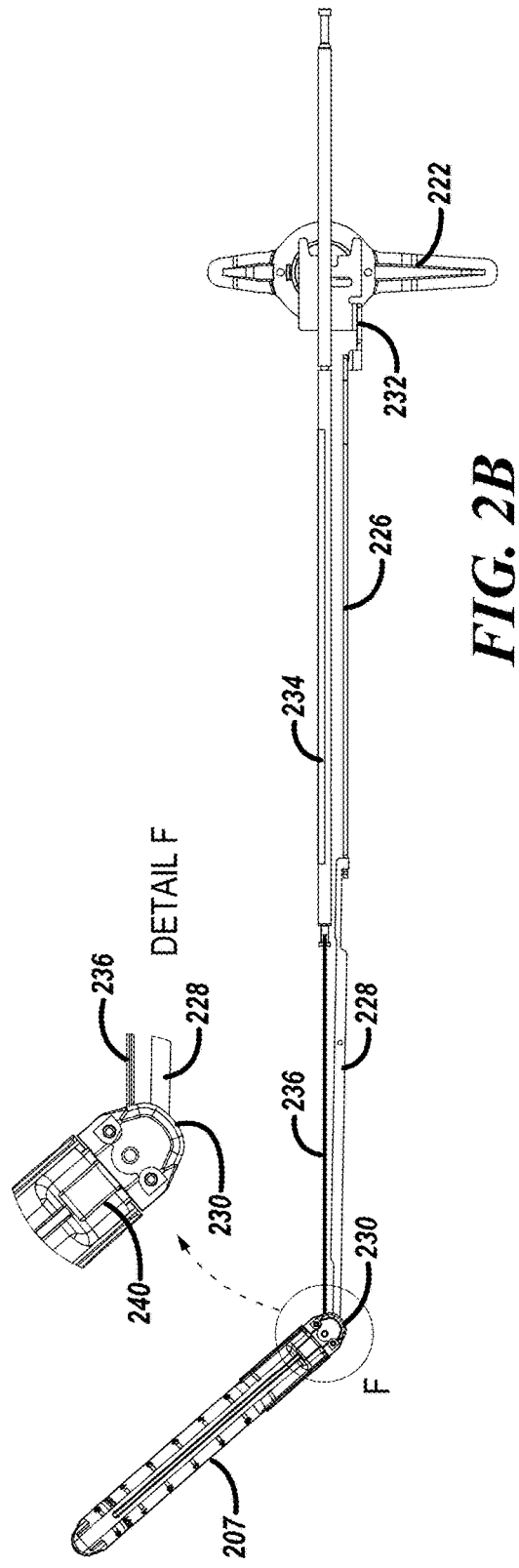
FIG. 2A
FIG. 2B

SURGICAL HANDLE ASSEMBLY

CROSS REFERENCE TO RELATED APPLICATION

This application is a continuation of U.S. application Ser. No. 18/129,324, filed Mar. 31, 2023, now issued as U.S. Pat. No. 12,089,846, on Sep. 17, 2024, which is a continuation of U.S. application Ser. No. 17/241,538, filed Apr. 27, 2021, now issued as U.S. Pat. No. 11,622,764 on Apr. 11, 2023, and which are incorporated herein by reference in their entireties.

TECHNICAL FIELD

The present disclosure relates generally to an articulatable surgical handle assembly.

BACKGROUND

A surgical handle assembly can be used in a number of surgical devices. One example includes use as a surgical stapler. A surgical stapler is a fastening device used to clamp tissue between opposing jaw structures to join tissue using surgical fasteners. Surgical staplers can include two elongated members used to clamp the tissue. One of the elongated members can include one or more reloadable cartridges and the other elongated member can include an anvil that can be used to form a staple when driven from the reloadable cartridge. A surgical stapler can receive one or more reloadable cartridges. An example of reloadable cartridges can include having rows of staples having a linear length. For example, a row of staples can have a linear length between 30 mm and 60 mm. A staple can be ejected by actuation of a movable handle member that is a part of the surgical handle assembly of the surgical stapler.

Some surgical staplers are equipped with an articulation mechanism that causes the distal portion of the stapler, the elongated members or jaws which house a staple cartridge and an anvil for forming the staples, to move away from or toward the longitudinal axis of the stapler. Articulation is an important feature of a stapler as it allows a physician or other user of the stapler to properly position the stapler jaws in the proper location and orientation. Some staplers also have a feature that allow a physician to open and close the jaws multiple times prior to delivering the staples. In some staplers that are equipped with an articulation arm, when the jaws of the stapler are articulated, the design of the stapler assembly will not allow the jaws to return to a fully open position.

BRIEF DESCRIPTION OF THE DRAWINGS

FIG. 2A is a schematic diagram of an apparatus including an articulation assembly and a drive assembly in accordance with a number of embodiments of the present disclosure.

FIG. 2B is a schematic diagram of an apparatus including an articulation assembly and a drive assembly in accordance with a number of embodiments of the present disclosure.

DETAILED DESCRIPTION

Figure 1:
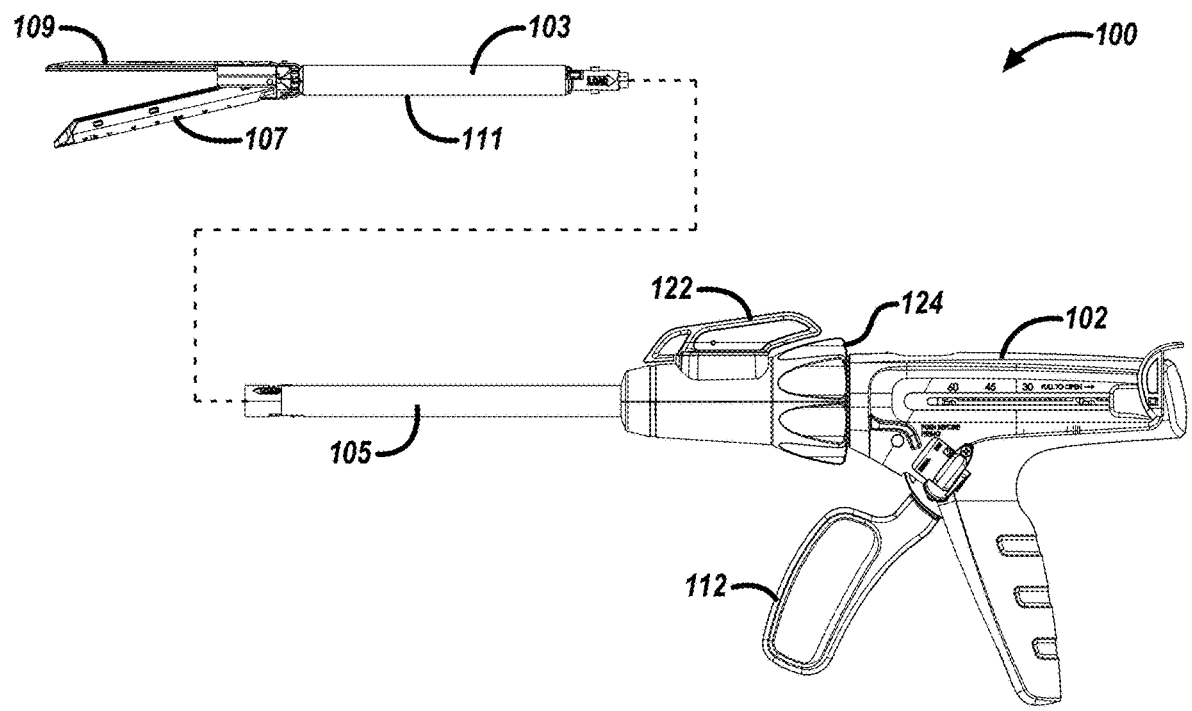
FIG. 1 is a schematic diagram of an apparatus including a surgical handle assembly and a reloadable cartridge assembly in accordance with a number of embodiments of the present disclosure.

The present disclosure includes apparatuses for a surgical handle assembly and surgical handles. An example apparatus includes a reloadable cartridge assembly and a surgical handle assembly including an articulation assembly configured to maintain the reloadable cartridge assembly in various positions. In some surgical handle reloadable cartridge assemblies, the user can articulate the distal end of the assembly by rotating a knob and cam assembly. Rotation of the knob and cam assembly causes an articulation arm to move in a linear direction.

In a number of embodiments, the reloadable cartridge assembly can include a first elongated member and a second elongated member that can be used to clamp tissue. One of the elongated members can house one or more staple cartridges. The other elongated member can have an anvil that can be used to form a staple when driven from the staple cartridge. Some reloadable cartridge assemblies have rows of staples. When in use and connected to a surgical handle assembly, a physician may rotate a knob and cam assembly of an articulation assembly. Rotation of the knob and cam assembly causes the articulation arm of the surgical handle assembly to move in a linear direction and, since the handle assembly is connected to the cartridge assembly, the articulation arm of the cartridge assembly will correspondingly move in a linear direction. This linear movement causes the elongated members to move away from or toward the longitudinal axis of the reloadable cartridge assembly.

Many surgical handle assemblies comprise a toothed rack that interacts with a movable handle and can move proximally and distally. A drive shaft can be connected to a distal end of the toothed rack and, when the reloadable cartridge assembly is attached to the surgical handle assembly, the drive shaft is connected to a blade shaft in the reloadable cartridge assembly. Distal movement of the toothed rack will cause open elongated members to close or clamp. Further distal movement of the toothed rack will cause staples to be delivered. If, at the point when the elongated members have just closed, the toothed rack is moved proximally, the elongated members will reopen or unclamp.

When articulated, the design of some prior art reloadable cartridge assemblies and/or surgical handle assemblies will not allow the elongated members to fully open during the unclamp process. Embodiments of this disclosure include surgical handle assembly designs that allow the elongated members to fully open even when the elongated members are in an articulated position.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is to be understood that the terminology used herein is for the purpose of describing particular embodiments only and is not intended to be limiting. As used herein, the singular forms "a", "an", and "the" can include both singular and plural referents, unless the context clearly dictates otherwise. In addition, "a number of", "at least one", and "one or more" can refer to one or more things, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically or for access to and movement of the movable handle member, as appropriate to the context.

The figures herein follow a numbering convention in which the first digit or digits correspond to the figure number and the remaining digits identify an element or component in the figure. Similar elements or components between different figures may be identified by the use of similar digits. For example, 448 may reference element "48" in FIG. 4, and a similar element may be referenced as 548 in FIG. 5. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a schematic diagram of an apparatus 100 including a surgical handle assembly 102 and a reloadable cartridge assembly 103 in accordance with a number of embodiments of the present disclosure. In some embodiments, the apparatus 100 can be a surgical stapler, for example.

As shown in the example of FIG. 1, the reloadable cartridge assembly 103, e.g. a disposable loading unit, can be releasably secured to a distal end of an elongated body of the surgical handle assembly 102. In this example, the reloadable cartridge assembly 103 can include a cartridge shaft 111 and a first elongated member 107 and a second elongated member 109 that can be used to clamp tissue. One of the elongated members can house one or more staple cartridges. The other elongated member can have an anvil that can be used to form a staple when driven from the staple cartridge. As mentioned, an apparatus 100 can receive reloadable cartridge assemblies having rows of staples. In a number of embodiments, third party reloadable cartridge and/or reloadable cartridge assemblies may be used with the surgical handle assembly 102 and embodiments of surgical handle assembly 102 may be configured to receive the same.

Handle assembly 102 can include a movable handle 112, radial positioner 124, knob and cam assembly 122 and handle shaft 105. The reloadable cartridge assembly 103 can be actuated using knob and cam assembly 122 and/or radial positioner 124 to reach a stapling site. Radial positioner 124 rotates the reloadable cartridge assembly 103. Knob and cam assembly 122 positions the distal end of the reloadable cartridge assembly 103 at a particular angle for stapling. The knob and cam assembly 122 can be configured to actuate rotationally and the first elongated member 107 and the second elongated member 109 can rotate about an axis of a particular plane in response to the knob and cam assembly 122 being actuated rotationally by a user.

FIGS. 2A and 2B are schematic diagrams of an apparatus including an articulation assembly and a drive assembly in accordance with a number of embodiments of the present disclosure. With reference to FIG. 1, FIGS. 2A and 2B are views from the bottom of apparatus 100. All directional references for these figures will be with regard to the orientation shown in FIG. 1. The articulation assembly can include a knob and cam assembly 222, a cam connector 232, a handle articulation arm 226, and a reload articulation arm 228. Reload articulation arm 228 is connected to jaw pivot assembly 230. When a user rotates knob and cam assembly 222 to the left and/or counterclockwise, as illustrated in FIG. 2A, it causes cam connector 232 to move in a proximal direction which in turn pulls handle articulation arm 226 and reload articulation arm 228 proximally. This causes the elongated members (e.g., elongated members 107 and 109 in FIG. 1) to move toward the left and/or counterclockwise. When a user rotates knob and cam assembly 222 to the right and/or clockwise, as illustrated in FIG. 2B, it causes cam connector 232 to move in a distal direction which in turn pushes the handle articulation arm 226 and the reload articulation arm 228 distally. This causes the elongated members to move toward the right and/or clockwise.

FIGS. 2A and 2B also show a drive mechanism for an apparatus, for example, a surgical stapler. The drive mechanism can include a toothed rack (e.g., toothed rack 340, 440, and 540 in FIGS. 3, 4, and 5, respectively), a drive shaft 234, and a blade shaft 236. As will be explained later, movement of a movable handle (e.g., movable handle 112 in FIG. 1) can cause distal and proximal movement of the toothed rack. This movement is transferred through drive shaft 234 and blade shaft 236 to I-beam 240. Distal movement of the toothed rack can cause the elongated members to close or clamp. Proximal movement of the toothed rack can cause the elongated members to open or unclamp. When in the clamped position, further distal movement of the toothed rack can cause staples to be delivered.

The reload articulation arm 228 can be attached to the jaw pivot assembly 230 on the right side. When the jaw pivot assembly 230 is articulated toward the side of the reload articulation arm 228, to the right and/or clockwise as illustrated in FIG. 2A, the opening and/or unclamping of the elongated members is impaired as the pulling of articulation member 228 compresses a reloadable cartridge unit (e.g., reloadable cartridge unit 103 in FIG. 1) and the rest of the apparatus. This binding of the apparatus will not allow the elongated members to completely unclamp. Prior art apparatuses including surgical staplers may completely unclamp when in the straight, non-articulated position and on some occasions when articulated away from the side of the reload articulation arm 228. In some embodiments, completely unclamped means that the elongated members open to an angle greater than 8 degrees and not completely unclamped means that the elongated members will only open to an angle of 8 degrees or less.

In some embodiments, the knob and cam assembly 222, the cam connector 232, the handle articulation arm 226, the toothed rack, and the drive shaft 234 are located within a surgical handle assembly (e.g., surgical handle assembly 102) and the reload articulation arm 228, the blade shaft 236, and I-beam 240 are located within a reloadable cartridge assembly (e.g., reloadable cartridge assembly 103 in FIG. 1).

Figure 3:
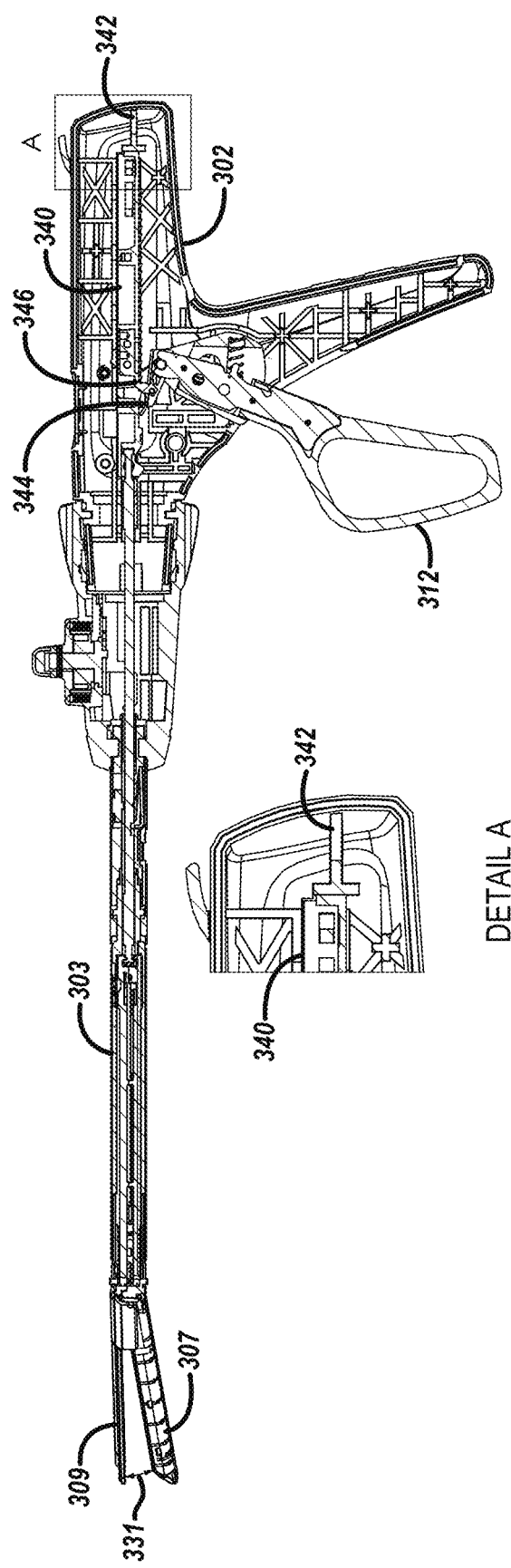
FIG. 3 is a schematic diagram of an apparatus including a prior art surgical handle assembly and a reloadable cartridge assembly in accordance with a number of embodiments of the present disclosure.

FIG. 3 is a schematic diagram of an apparatus including a prior art surgical handle assembly 302 and a reloadable cartridge assembly 303 in accordance with a number of embodiments of the present disclosure. Here, a stop 342 limits the proximal movement of toothed rack 340. It is important that the toothed rack 340 and/or the drive shaft (e.g., drive shaft 234 in FIGS. 2A and 2B) are properly positioned so that reloadable cartridges can be connected and/or disconnected. When the toothed rack 340 is in its most proximal position and is touching stop 342 the apparatus is in the loading position where reloadable cartridges can be connected and/or disconnected. Movement of movable handle 312 causes movement of driving pawl 344 and latch 346. During the clamping and unclamping process, proximal movement of the movable handle 312 causes driving pawl 344 to move in a distal direction which pushes toothed rack 340 in a distal direction. As discussed herein, this distal movement causes the I-beam (e.g., I-beam 240 in FIG. 2) of the reloadable cartridge assembly 303 to interact with elongated members 307 and 309 causing them to close and/or clamp. Distal movement of movable handle 312 causes latch 346 to interface with toothed rack 340 and to move toothed rack 340 in a proximal direction until the toothed rack 340 is at the loading position. This proximal movement of the toothed rack 340 causes the I-beam to move proximally allowing elongated members 307 and 309 to open and/or unclamp.

When the prior art apparatus of FIG. 3 is articulated, for example, towards a side of a reload articulation arm (e.g., reload articulation arm 228 in FIGS. 2A and 2B), the elongated members 307 and 309 of the prior art apparatus are prevented from completely opening and/or unclamping. For example, the prior art apparatus may only open to angle 331. Angle 331 can be 8 degrees or less. For example, the elongated members 307 and 309 can open to an angle 331 of 6 to 8 degrees.

Figure 4:
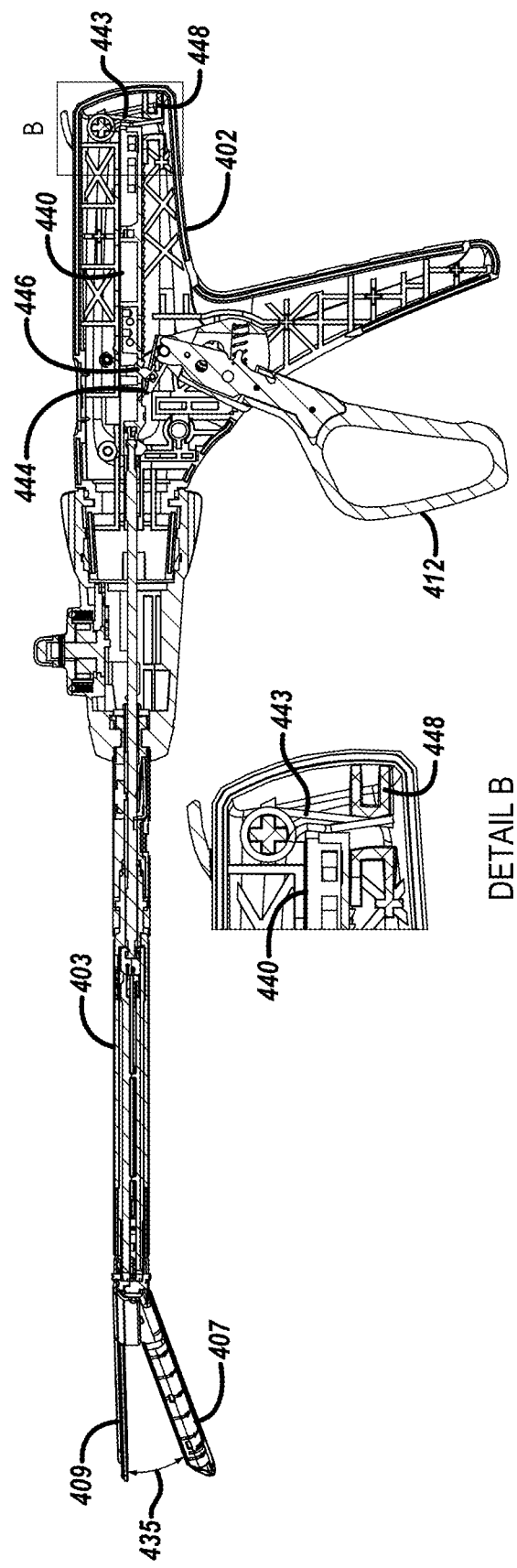
FIG. 4 is a schematic of diagram of an apparatus including a surgical handle assembly and a reloadable cartridge assembly in accordance with a number of embodiments of the present disclosure.

FIG. 4 is a schematic of diagram of an apparatus including a surgical handle assembly 402 and a reloadable cartridge assembly 403 in accordance with a number of embodiments of the present disclosure. FIG. 4 shows an aspect of the invention and is an instantaneous view of the movable handle 412 being moved distally during an unclamping process which causes latch 446 to move the toothed rack 440 in a proximal direction past a loading position. Additional movement of the blade shaft (e.g., blade shaft 236 in FIGS. 2A and 2B), drive shaft (e.g., drive shaft 234 in FIGS. 2A and 2B), and toothed rack 440 in the proximal direction causes the proximal end of toothed rack 440 to compress spring 443. This overshoot compensates for the play in the apparatus and allows the reload articulation arm (e.g., reload articulation arm 228 in FIGS. 2A and 2B) of the reloadable cartridge assembly 403 to be fully retracted and the elongated members 407 and 409 to fully open. This is a momentary position as the strength of the spring 443 will drive the toothed rack 440 distally back to the loading position. The spring 443 can have a force of 2 to 7 pounds. In a number of embodiments, the spring 443 can have a force of 18 Newtons or 4.05 pounds. In some examples, the spring 443 can have a force of between 4 and 5 pounds.

As illustrated in FIG. 4, the elongated members 407 and 409 may be fully open and/or unclamped when the proximal end of the toothed rack 440 is proximal of the loading position. Even when the elongated members 407 and 409 are articulated, for example, towards a side of an articulation arm (e.g., reload articulation arm 228 in FIGS. 2A and 2B), the elongated members 407 and 409 can completely open and/or unclamp. For example, the apparatus of FIG. 4 may open to angle 435. Angle 435 can be greater than angle 331 in FIG. 3. Angle 435 can be greater than 8 degrees. For example, the elongated members 407 and 409 can open to an angle 435 of 13 to 15 degrees.

In a number of embodiments, when positioning the apparatus (e.g., stapler) for use, either in open surgery or through an instrument such as a trocar, the clinician may need to rotate and/or articulate the elongated members 407 and 409 to position them properly. As the stapler is used to clamp, staple, and cut tissue, in some instances the clinician may need to clamp and unclamp the elongated members 407 and 409 to ensure that they are properly positioned. With some prior art devices, when the elongated members 407 and 409 are articulated, especially when the reload articulation arm is moved proximally, the stapler will bind up and the elongated members 407 and 409 will not be able to fully open. In this instance, the clinician either puts up with the non-optimal opening or can move the elongated members 407 and 409 to a non-articulated position to fully open them. With the embodiments of this invention, when the clinician attempts to unclamp the elongated members 407 and 409, they will fully reopen allowing for easier and more accurate placement. Once the elongated members 407 and 409 are in position, the clinician will clamp the elongated members 407 and 409 and deliver the staples. The cutter on the I-beam (e.g., I-beam 240 in FIGS. 2A and 2B) will cut the tissue as the staples are being delivered.

Figure 5:
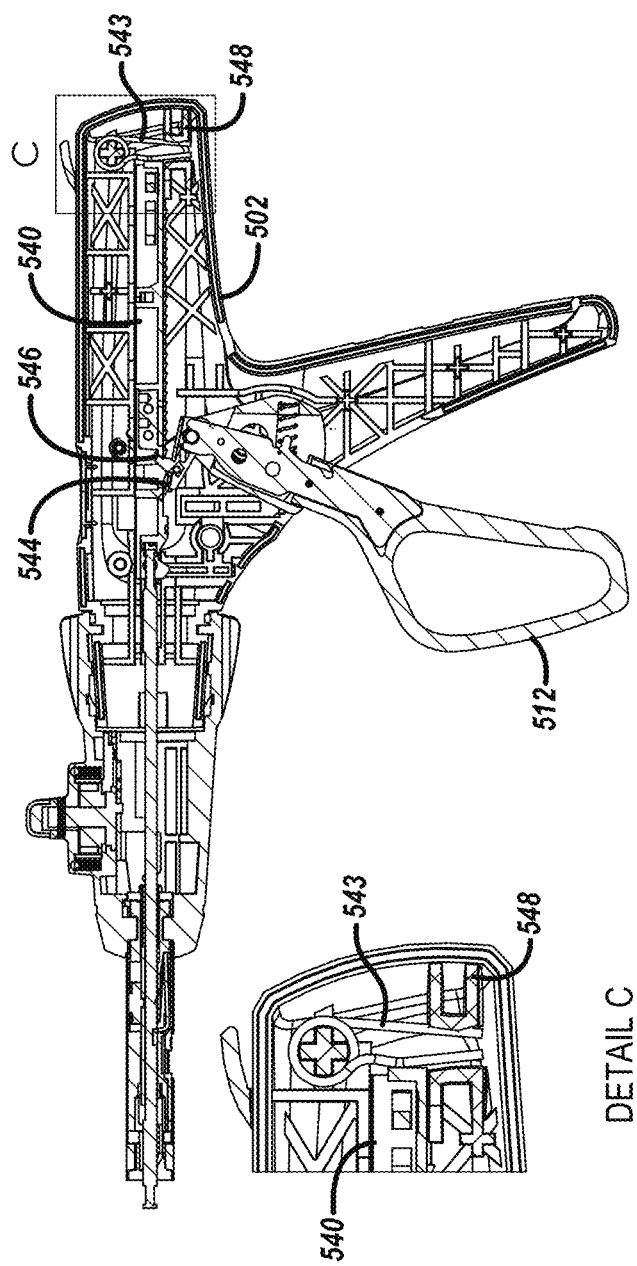
FIG. 5 is a schematic diagram of an apparatus including a surgical handle assembly in accordance with a number of embodiments of the present disclosure.

FIG. 5 is a schematic diagram of an apparatus including a surgical handle assembly 502 in accordance with a number of embodiments of the present disclosure. FIG. 5 illustrates the toothed rack 540 in the loading position. Here, a spring 543 is positioned at the proximal end of toothed rack 540. The spring 543 allows the toothed rack 540 to move proximally past the loading position before the spring 543 returns the toothed rack 540 to the loading position. After the movable handle 512 has been moved proximally and the distal movement of the toothed rack 540 causes elongated members (e.g., elongated members 407 and 409 in FIG. 4) to clamp, distal movement of the movable handle 512 can cause the latch 546 to drive the toothed rack 540 proximally. Further movement will cause the toothed rack 540 to overshoot the loading position. For example, a proximal end of the toothed rack 540 will be positioned proximal of the loading position. This overshoot allows for the unloading (or uncompressing) of a reloadable cartridge assembly (e.g., reloadable cartridge assembly 403 in FIG. 4). By allowing the toothed rack 540, drive shaft (e.g., drive shaft 234 in FIGS. 2A and 2B), and blade shaft (e.g., blade shaft 236 in FIGS. 2A and 2B) to move proximal of the loading position, the I-beam (e.g., I-beam 240 in FIGS. 2A and 2B) can be fully retracted from the elongated members, allowing the elongated members to fully open and/or unclamp.

In FIG. 5, spring 543 is shown as a U-spring, although any spring or spongy material can be used as long as the spring mechanism allows for the proximal overshoot and has enough strength to move the toothed rack 540 back to the loading position. For example, a compression coil spring can be used. In a number of embodiments, a stop 548 may be used to properly position the spring 543. When toothed rack 540 is at rest and the proximal end of the toothed rack 540 is touching the unloaded or at rest spring 543, the surgical handle assembly 502 is in the loading position.

Although the embodiments were described with respect to a specific drive assembly and articulation assembly, the embodiments described herein are equally applicable to other drive mechanisms and articulation mechanisms. As long as the drive assembly and articulation assembly are comprised of rods or beams that travel in the shafts of the reloadable cartridge assembly and the surgical handle assembly 502, these embodiments are applicable. Similarly, in FIGS. 2A and 2B a particular arrangement of connecting the blade shaft 236 and reload articulation arm 228 to jaw pivot assembly 230 is shown. The embodiments of this disclosure are applicable to other connection arrangements. Regardless of the connection arrangement, when the reload articulation arm is pulled in a proximal direction and the elongated members are articulated to the articulation arm side or position, the elongated members will not fully open but can be fully opened if the teachings of this disclosure are followed.

In some of the embodiments described herein, the drive mechanism is the movable handle 512. These embodiments are equally applicable to powered handles where an electric motor drives the toothed rack and/or drive assembly. In some embodiments, an electric motor is configured to move the drive assembly while a movable handle 512 is used to clamp and unclamp the elongated members.

Some of the embodiments described herein have a surgical handle assembly 502 with a reloadable cartridge unit. The embodiments herein are equally applicable to a staple system where the reloadable cartridge unit is just a staple cartridge that is loaded into one of the elongated members.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of operating a surgical handle assembly, the method comprising:
   moving a toothed rack of a surgical handle assembly apparatus in a proximal direction while (i) elongated members of a reloadable cartridge assembly are in a clamped position and (ii) the reloadable cartridge assembly is coupled to the surgical handle assembly apparatus;
   compressing, to a first state of compression, a spring positioned at a proximal end of the toothed rack as the toothed rack moves proximally past a loading position, the loading position corresponding to a position of the toothed rack at which the proximal end of the toothed rack is contacting the spring while the spring is in a second, lower state of compression; and
   allowing the elongated members to transition between the clamped position and a fully open position while the toothed rack is at a position proximal the loading position.

2. The method of claim 1, further comprising moving the toothed rack distally toward the loading position from the position proximal the loading position.

3. The method of claim 2 wherein moving the toothed rack distally includes transitioning the spring from the first state of compression toward the second state of compression such that the spring drives the toothed rack toward the loading position.

4. The method of claim 1 wherein moving the toothed rack proximally includes moving the toothed rack proximally based at least in part on distal movement of a movable handle of the surgical handle assembly.

5. The method of claim 1 wherein moving the toothed rack proximally includes moving the toothed rack proximally based at least in part on actuation of an electric motor of the surgical handle assembly.

6. The method of claim 1, further comprising articulating the elongated members away from a longitudinal axis of the reloadable cartridge assembly.

7. The method of claim 6 wherein articulating the elongated members away from the longitudinal axis includes actuating a knob and cam assembly of the surgical handle assembly.

8. The method of claim 7 wherein actuating the knob and cam assembly includes rotating the knob and cam assembly counterclockwise such that the elongated members are articulated counterclockwise, or rotating the knob and cam assembly clockwise such that the elongated members are articulated clockwise.

9. The method of claim 6 wherein articulating the elongated members away from the longitudinal axis includes binding the elongated members in the clamped position.

10. The method of claim 1 wherein moving the toothed rack proximally, compressing the spring, and allowing the elongated members to transition from the clamped position to the fully open position each occur while the elongated members are in an articulated position away from a longitudinal axis of the reloadable cartridge assembly.

11. The method of claim 1, further comprising clamping the elongated members.

12. The method of claim 11 wherein clamping the elongated members includes moving the toothed rack distally.

13. The method of claim 12 wherein moving the toothed rack distally includes moving the toothed rack distally based at least in part on actuation of an electric motor of the surgical handle assembly apparatus.

14. The method of claim 12 wherein moving the toothed rack distally includes moving the toothed rack distally based at least in part on proximal movement of a movable handle of the surgical handle assembly.

15. The method of claim 11 wherein compressing the spring includes compressing a torsional spring, a U-spring, or a compression coil spring.

16. The method of claim 1 wherein moving the toothed rack proximally and compressing the spring includes retracting an articulation arm of the reloadable cartridge assembly such that the elongated members are transitioned from a bound state to an unbound state.

17. The method of claim 16 wherein allowing the elongated members to transition from the clamped position to the fully open position includes allowing the elongated members to open to an angle of 13 to 15 degrees.

18. The method of claim 1 wherein allowing the elongated members to transition from the clamped position to the fully open position includes allowing the elongated members to open to an angle of greater than eight degrees.

19. A method of operating a surgical handle assembly, the method comprising:
    articulating elongated members of a reloadable cartridge assembly connected to the surgical handle assembly, wherein articulating the elongated members includes moving the elongated members away from a longitudinal axis of the reloadable cartridge assembly; and
    while the elongated members are articulated away from the longitudinal axis, moving a toothed rack in a proximal direction such that the elongated members transition from a clamped position to a fully open position, wherein moving the toothed rack in the proximal direction includes compressing a spring positioned at a proximal end of the toothed rack.

20. A method of unbinding a surgical handle assembly apparatus including a surgical handle assembly and a reloadable cartridge assembly coupled to the surgical handle assembly, the method comprising:
    while elongated members of the reloadable cartridge assembly are in a clamped position and are articulated away from a longitudinal axis of the reloadable cartridge assembly—
        actuating the surgical handle assembly to move a drive assembly of the surgical handle assembly in a proximal direction,
        compressing, toward a first state of compression, a spring positioned at a proximal end of the drive assembly, and
        transitioning the elongated members from the clamped position to a fully open position while the spring is in the first state of compression; and
    moving the drive assembly distally toward a loading position using a force exerted by the spring as the spring transitions from the first state of compression toward a second, lower state of compression.

* * * * *